(12) United States Patent
Shen et al.

(10) Patent No.: US 10,273,325 B2
(45) Date of Patent: Apr. 30, 2019

(54) POLYMER DISPERSIONS HAVING NANOSIZED POLYUREA PARTICLES DISPERSED IN A POLYETHER

(71) Applicants: Dow Global Technologies LLC, Midland, MI (US); Rohm and Haas Company, Philadelphia, PA (US)

(72) Inventors: Hongwei Shen, Holmdel, NJ (US); Ralph C. Even, Blue Bell, PA (US)

(73) Assignees: Dow Global Technologies LLC, Midand, MI (US); Rohm and Haas Company, Philadelphia, PA (US)

( * ) Notice: Subject to any disclaimer, the term of this patent is extended or adjusted under 35 U.S.C. 154(b) by 312 days.

(21) Appl. No.: 15/103,263

(22) PCT Filed: Dec. 11, 2014

(86) PCT No.: PCT/US2014/069716
§ 371 (c)(1),
(2) Date: Jun. 9, 2016

(87) PCT Pub. No.: WO2015/094899
PCT Pub. Date: Jun. 25, 2015

(65) Prior Publication Data
US 2016/0311965 A1 Oct. 27, 2016

Related U.S. Application Data

(60) Provisional application No. 61/918,488, filed on Dec. 19, 2013.

(51) Int. Cl.
| C08G 18/76 | (2006.01) |
| C08G 18/48 | (2006.01) |
| C08G 18/66 | (2006.01) |
| C08G 18/08 | (2006.01) |
| C08G 18/10 | (2006.01) |
| C08G 18/32 | (2006.01) |
| C08G 18/40 | (2006.01) |

(52) U.S. Cl.
CPC ..... *C08G 18/7671* (2013.01); *C08G 18/0876* (2013.01); *C08G 18/10* (2013.01); *C08G 18/324* (2013.01); *C08G 18/3228* (2013.01); *C08G 18/409* (2013.01); *C08G 18/4833* (2013.01); *C08G 18/4841* (2013.01); *C08G 18/6674* (2013.01); *C08G 18/7664* (2013.01)

(58) Field of Classification Search
CPC ............... C08G 18/0876; C08G 18/409
See application file for complete search history.

(56) References Cited

U.S. PATENT DOCUMENTS

| 4,595,742 A | 6/1986 | Nalepa |
| 2007/0203288 A1 | 8/2007 | Dorr |
| 2013/0281584 A1 | 10/2013 | Woutters |

FOREIGN PATENT DOCUMENTS

| CA | 2037082 A | 9/1991 | |
| EP | 448813 A | 10/1991 | |
| WO | WO-2012095236 A1 * | 7/2012 | ......... C08G 18/0852 |
| WO | 2012154831 A | 11/2012 | |
| WO | 2012514820 A | 11/2012 | |

OTHER PUBLICATIONS

Machine Translation of EP 0448813 A1 (Year: 1991).*

* cited by examiner

*Primary Examiner* — Michael M Dollinger

(57) ABSTRACT

Dispersions of polyurea particles are made by reacting polyisocyanate compounds and coreactants that include at least one polyamine while dispersed in a base polyether. The polyisocyanate or the polyamine, or both, has a functionality of at least 2. A highly preferred coreactant is an alkylthio-substituted aromatic diamine such as 3,5-di(methylthio)-2, 4-toluene diamine. The dispersions have extremely small particles, which promotes storage stability.

7 Claims, No Drawings

POLYMER DISPERSIONS HAVING NANOSIZED POLYUREA PARTICLES DISPERSED IN A POLYETHER

This invention relates to a method for making dispersions of polyurea particles in a polyol useful for the production of flexible polyurethane foam.

Dispersions of polyurea particles in polyols are well-known materials. They are commonly called "PHD polyols". They are commonly used to make polyurethane foams. The dispersed particles can help open the cells of a flexible foam. They can also increase the load-bearing of the foam and in some cases can improve fire performance.

PHD polyols are made by reacting a polyisocyanate compound with an amine or hydrazide while the materials are dispersed in a polyol. The polyisocyanate reacts with the amine or hydrazide groups to form particles of a polyurea polymer that are dispersed into the polyol, which forms a continuous phase.

A small amount of the polyol molecules may also react. In this manner, a certain amount of the polyol can become "grafted" to the dispersed polyurea particles. This grafting helps to stabilize the dispersion.

Unfortunately, the grafting that occurs is often not sufficient to form a stable dispersion. Over time, the dispersed polyurea particles can settle out of the dispersion. This leads to a number of problems. The settled particles can be very difficult to redisperse. The quantity of particles that remain dispersed in the polyol can vary from time to time, or even within sections of a container of the material. This leads to large inconsistencies in the product which, in turn, leads to large inconsistencies in polyurethanes made using the product.

One way to improve the stability of a PHD polyol is to decrease the particle size. Smaller particles are more hydrodynamically stable and therefore are less prone to settle. Thus, a method by which a PHD polyol can be made with very small particles is desirable.

The invention is in one aspect a process for preparing a dispersion of polyurea polymer particles in a base polyether, comprising (I) forming an agitated mixture of (i) one or more polyisocyanate compounds, (ii) one or more coreactants that includes at least one polyamine compound having an equivalent weight per primary and/or secondary amine group of up to 200, and a base polyether having a molecular weight of at least 600, provided that the polyisocyanate compound(s) have an average functionality of at least 2.4 and/or the polyamine compound(s) contain an average of at least 2.4 primary and/or secondary amino groups, and (II) reacting the coreactant(s) with the polyisocyanate compound(s) in the presence of the base polyether, to form the dispersion of polyurea particles in the base polyether.

Applicants have found that, the selection of high functionality starting materials, either the polyisocyanate or the polyamine, or both, greatly favors the formation of extremely small polyurea particles. This leads to high dispersion stability.

The polyisocyanate is a single compound or mixture of isocyanate-containing compounds. The polyisocyanate preferably has an isocyanate equivalent weight of up to 300, more preferably up to 250, still more preferably up to 175 and in some embodiments 50 to 175.

Examples of isocyanate compounds that have three or more isocyanate groups include, 4,4',4"-triphenyl methane triisocyanate, polymethylene polyphenylisocyanates, toluene-2,4,6-triisocyanate and 4,4'-dimethyldiphenylmethane-2,2',5,5'-tetraisocyanate. Mixture of one or more of these with a diisocyanate can be used, particularly if the mixture contains an average of at least 2.4 isocyanate groups per molecule. Examples of such diisocyanates include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, 1,3- and/or 1,4-bis(isocyanatomethyl)cyclohexane (including cis- and/or trans isomers) methoxyphenyl-2,4-diisocyanate, diphenylmethane-4,4'-diisocyanate, diphenylmethane-2,4'-diisocyanate, hydrogenated diphenylmethane-4,4'-diisocyanate, hydrogenated diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate and 3,3'-dimethyldiphenyl methane-4,4'-diisocyanate.

The polyisocyanate preferably is a so-called polymeric MDI product that contains a mixture of diphenylmethane diisocyanate (including any or the 2,4'-, 4,4'- and 2,2'-isomers) and one or more polymethylene polyphenylisocyanates. These mixtures are available commercially and are commonly called either "crude MDI" or "polymeric MDI" products.

The coreactant includes at least one polyamine compound having at least two primary and/or secondary amino groups and an equivalent weight per primary and/or secondary amino group of up to 200, preferably up to 125 and more preferably up to 75. The polyamine compound(s) preferably constitute at least 50 mole percent, more preferably at least 70 mole percent, of the coreactants. The polyamine compound(s) may be the only coreactants.

Examples of suitable polyamine compounds include linear or branched alkyl monoamines polyamines having 1 to 100 carbon atoms; linear or branched alkylene diamines having up to 100 carbon atoms; polyalkylene polyamines containing at least three primary and/or secondary amine groups; amine-terminated polyethers; cycloaliphatic polyamines and aromatic polyamines.

Specific examples of polyamine compounds include ethylene diamine, 1,2-propylene diamine, 1,3-propylene diamine, tetramethylene diamine, dodecamethylene diamine, hexamethylene diamine, N,N'-dimethylethylenediamine, 2,2-bis-aminopropylmethylamine, diethylene triamine, triethylene tetraamine, tetraethylene pentaamine, dipropylenetriamine, piperazine, N,N'-bis-aminoethylpiperazine; triazine, 4-aminobenzylamine, 4-aminophenylethylamine, 1-amino-3,3,5-trimethyl-5-aminomethylcyclohexane, 4,4'-diaminodicyclohexyl methane, 4,4'-diaminocyclohexyl propane, 1,4-diaminocyclohexane, phenylene diamine, toluene diamine, 3,5-diethyl-2,4-toluene diamine, bis-aminomethyl benzene, methylene (diphenylamine), polyoxypropylene diamines, and the like.

An especially preferred coreactant is a dialkylthio-substituted aromatic diamine. The alkylthio-substituted aromatic diamine includes compounds represented by the structure:

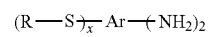

wherein x is a number of at least 1, preferably 1 to 4, more preferably 1 to 2 and most preferably 2, R represents an alkyl group and Ar represents an aromatic ring structure. Each R—S— group and each —NH$_2$ group is bonded directly to an aromatic ring carbon of the Ar group. The R group can be linear, branched or cyclic. It preferably contains 1 to 4 carbon atoms, more preferably 1-2 carbon atoms and is most preferably methyl. The Ar group preferably is phenyl or an alkyl-substituted phenyl, but can also be, for example, naphthyl or other multi-ring structure. The R group and Ar group each can be substituted with substituents which do not react with isocyanate, hydroxyl or amine groups under the conditions of the reaction that forms the dispersion. The Ar group may be alkyl-substituted as mentioned, and also can be, for example, alkoxy-substituted.

An example of a suitable alkylthio-substituted aromatic diamine is 3,5-di(methylthio)-2,4-diaminotoluene. This diamine is available commercially as Ethacure™ 300 from Albemarle Corporation.

The alkylthio-substituted aromatic diamine may be used as a mixture with one or more other coreactants as described above.

At least one of the polyisocyanate and the polyamine compound has an average functionality of at least 2.4.

"Polyisocyanate functionality" or "polyisocyanate average functionality" refers to the average number of isocyanate groups per molecule of isocyanate-containing compound(s). The average functionality of the polyamine compound(s) refers to the average number of primary and secondary amine groups combined per polyamine molecule. For purposes of calculating the average functionality of the polyamine compound(s), any optional monoamine compounds as described below are ignored.

In some embodiments, the polyisocyanate compound(s) have an average of at least 2.8 isocyanate groups per molecule. The polyisocyanate preferably has an average of up to 4 isocyanate groups per molecule and still more preferably has 2.8 to 3.5 isocyanate groups per molecule.

When the polyisocyanate compound(s) an average functionality of 2.4 or more, the polyamine compound(s) can have an average functionality of as little as 2.0.

In other embodiments, the polyamine compound(s) have an average functionality of at least 2.8, preferably up to 4, primary and/or secondary amino groups per molecule, more preferably 2.8 to 3.5 primary and/or secondary amino groups per molecule. When the polyamine compound(s) have an average functionality of 2.4 or greater, the polyisocyanate can have an average functionality of as little as 2.0.

The coreactant can include additional isocyanate-reactive compounds in addition to the polyamine compound(s). These additional isocyanate-reactive materials, if present, preferably are used in relatively small amounts, such as up to 50 mole percent, more preferably up to 25 mole percent, still more preferably up to 10 mole percent, of all coreactants. Additional coreactive materials preferably have an equivalent weight of up to 300, more preferably up to 250, based on isocyanate reactive groups. The isocyanate reactive groups may be, for example, primary amino, secondary amino and/or hydroxyl groups. Among the useful coreactants include, monoamines, polyols, and aminoalcohols having only one primary and/or secondary amino group.

Examples of suitable additional coreactants include, for example, ethyl amine, propyl amine, butyl amine, hexyl amine, cyclohexyl amine, polyether monoamines, triethanolamine, diethanolamine, monoethanolamine, triisopropanolamine, diisopropanol amine, monoisopropanolamine, aminobutanol, polyoxypropylene monoamines, glycerin, trimethylolpropane, ethylene glycol, diethylene glycol, triethylene glycol, 1,2-propylene glycol, dipropylene glycol, erythritol, pentaerythritol, and the like. Aminoalcohols are preferred coreactants.

The base polyether used as a starting material in this invention may have a nominal functionality (number of hydroxyl groups per molecule) as low as zero, but preferably has a nominal functionality of at least 1 and more preferably has a nominal functionality of at least 2.0. By "nominal" functionality, it is meant the average number of oxyalkylatable hydrogens per molecule of the initiator(s) used in making the base polyether. The nominal functionality preferably is at least 2.5 and more preferably at least 3.0. It may be as high as 6.0, but more preferably is no more than 4.0.

The hydroxyl groups (if any) of the base polyether may be primary or secondary hydroxyls, or some mixture of both. Accordingly, in some embodiments, at least 50% of the hydroxyl groups of the base polyether are primary hydroxyls. The base polyether may contain at least 85%, at least 92%, at least 95% or at least 98% of primary hydroxyls. Conversely, the base polyether may contain no more than 25%, no more than 15%, no more than 8%, no more than 5% or no more than 2% secondary hydroxyls.

The base polyether preferably is a homopolymer or copolymer of propylene oxide. Useful copolymers of propylene oxide include random copolymers of propylene oxide and ethylene oxide, in which the copolymer contains a low proportion of primary hydroxyl groups as described above. These are prepared by polymerizing a mixture of propylene oxide and ethylene oxide. The mixture preferably contains at least 80% by weight propylene oxide and no more than 20% ethylene oxide. A more preferred mixture contains 85 to 99.5% by weight propylene oxide and 0.5 to 15% by weight ethylene oxide.

Another useful copolymer of propylene oxide is a block copolymer containing one or more internal blocks of polymerized ethylene oxide and terminal blocks of polymerized propylene oxide. Such a copolymer may contain a proportion of primary hydroxyl groups as described before. The ethylene oxide block or blocks can in the aggregate constitute 0.5 to 30% of the weight of the copolymer, although a preferred weight of the block or blocks is 0.5 to 20% of the total weight of the copolymer.

The base polyether can be prepared by polymerizing the oxide or oxides. This is typically performed in the presence of an initiator compound or mixture of initiator compounds, the presence of which provides molecular weight control and also approximately fixes the number of hydroxyl groups of the polyether product. The initiator(s) have an average at least one oxyalkylatable hydrogen atom per molecule and preferably have an average of at least two oxyalkylatable hydrogen atoms per molecule. Hydroxyl groups, primary amine groups, secondary amine groups and thiol groups are examples of groups that contain oxyalkylatable hydrogen atoms. Primary amine groups each contain two oxyalkylatable hydrogens. Examples of initiator compounds are water, ethylene glycol, 1,2-propane diol, 1,3-propane diol, diethylene glycol, dipropylene glycol, triethylene glycol, tripropylene glycol, cyclohexanedimethanol, methyl amine, ethyl amine glycerin, trimethylolpropane, trimethylolethane, pentaerythritol, erythritol, sucrose, sorbitol, mannitol, diethanolamine, monoethanolamine, triethanolamine, ethylene diamine, toluene diamine, 1,2-propane diamine, and the like. Mixtures of two or more of the foregoing initiators can be used.

The base polyether may also be a mixture of polyether polyols, each made using a different initiator, and each having a molecular weight as described below, which are then blended to form a mixture having a desirable average functionality.

The molecular weight of the base polyether is at least 600, preferably at least 1000. When, as preferred, the base polyether contains hydroxyl groups, the hydroxyl equivalent weight of the base polyether preferably is at least 300, and may be as high as about 6000. A preferred hydroxyl equivalent weight is 360 to 3000, a more preferred equivalent weight is 500 to 2000, and an especially preferred equivalent weight is 900 to 1700. If the base polyether is a mixture of two or more polyether polyols, each of the separately made polyols preferably has a hydroxyl equivalent weight within these ranges.

The dispersion is made by forming an agitated mixture of the coreactant(s), polyisocyanate, base polyether and optional components as described herein (if any) and subjecting the mixture to conditions under which the coreactant(s) and the polyisocyanates react to form polyurea particles.

The amounts of starting materials (including the base polyether, polyisocyanate compound(s), coreactant(s) and optional ingredients (if any)) preferably are selected together to provide a solids content from 1 to 50% by weight, preferably 5 to 30% by weight and more preferably 8 to 25% by weight and especially 8 to 15% by weight. Solids content refers to the weight of the polyurea particles as a percentage of the combined weight of the particles and the base polyether. For purposes of this invention, the weight of the polyurea particles is a calculated weight, equal to the combined weight of the polyisocyanate compounds, coreactant(s), and the particles in any seed dispersion as may be used.

In addition, the amounts of polyisocyanate compounds and coreactant(s) preferably are selected together to provide 0.5 to 2, preferably 0.65 to 1.5, isocyanate groups per isocyanate-reactive group provided by the coreactant(s). Note that for purposes of calculating this ratio, a primary amino group is considered as one isocyanate-reactive group despite the ability of such groups theoretically to react difunctionally with isocyanate groups. In some embodiments, an excess of the coreactant(s) is provided. This produces unreacted amine and/or hydroxyl (if a hydroxyl-containing coreactant is used) groups on the polyurea particles. The amount of unreacted amine and/or hydroxyl groups can be varied by selecting a greater or smaller excess of the coreactant(s).

In terms of weight, about 1 to 50 parts of the coreactant(s) is provided per 100 parts by weight of base polyether. A preferred amount is at least 2 parts, more preferably at least 3 parts, per 100 parts by weight of base polyether. A preferred upper amount is up to 20 parts, more preferably up to 15 parts by weight per 100 parts by weight of the base polyether. In some specific embodiments, 3 to 10 or 3 to 7 parts by weight are used per 100 parts by weight of base polyether.

The amount of polyisocyanate can be, for example, 1 to 50 parts by weight per 100 parts by weight of base polyether. A preferred amount is at least 2 parts, more preferably at least 3 parts, per 100 parts by weight of base polyether. A preferred upper amount is up to 20 parts, more preferably up to 15 parts by weight per 100 parts by weight of the base polyether. In some specific embodiments, 3 to 10 or 3 to 7 parts by weight of polyisocyanate are combined per 100 parts by weight of base polyether.

A catalyst may be present to promote the particle-forming reaction. The catalyst is a material which catalyzes the reaction of the amine and/or hydroxyl groups of the coreactant(s) with an isocyanate group. It may also catalyze some reaction between the base polyether and the isocyanate compound(s) to graft the particles to the base polyether. Suitable catalysts include, for example, tertiary amines, cyclic amidines, tertiary phosphines, various metal chelates, acid metal salts, strong bases, various metal alcoholates and phenolates and metal salts of organic acids. Catalysts of most importance are tertiary amine catalysts, cyclic amidines, and tin catalysts. Examples of tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used.

Examples of tin catalysts are stannic chloride, stannous chloride, stannous octoate, stannous oleate, dimethyltin dilaurate, dibutyltin dilaurate, other tin compounds of the formula $SnR_n(OR)_{4-n}$, wherein R is alkyl or aryl and n is 0-2, and the like. Tin catalysts are generally used in conjunction with one or more tertiary amine catalysts, if used at all. Tin catalysts tend to be strong gelling catalysts, so they are preferably used in small amounts.

Catalysts are typically used in small amounts, each catalyst being employed for example, in an amount of about 0.0015 to about 5% by weight of base polyether.

A stabilizer may be included in the reaction mixture. The stabilizer is a material which stabilizes the particles against agglomeration and/or settling. Examples of suitable stabilizer materials include various types of functionalized polyethers such as those described in U.S. Pat. No. 4,305,857, previously-formed polyurea or polyisocyanate polyaddition dispersions (which can also function as seed particles), various types of surfactants and the like. However, an advantage of this invention is that such separately-added stabilizers and seed dispersions are not needed to form dispersions which have very small particles and excellent stability. Therefore, in some embodiments, the process of the invention is performed in the absence of a separately-added stabilizer and a seed dispersion.

The dispersion may be prepared in the presence of 4 weight-% or more water, based on the total weight of all starting materials, as described in U.S. Pat. No. 4,305,857, or in the presence of lesser amounts or even no water.

The order of addition of base polyether, polyisocyanate, coreactant(s) and optional reactive ingredients is generally not critical, provided that the reaction of the coreactant(s) with the polyisocyanate occurs in the presence of the base polyether. It is often advantageous to disperse the coreactant(s) into the base polyether before adding the polyisocyanate compound. However, it is possible to reverse this order of addition, taking care not to allow the polyisocyanate to react extensively with the base polyether. One may also introduce the coreactant(s) and polyisocyanate compound to the base polyether simultaneously, as through a mixhead.

The coreactant(s) can be added in increments, and if there are two or more different coreactants, they can be added at different times. For example, a polyamine coreactant may be reacted first with the polyisocyanate to form particles, followed by adding an aminoalcohol or polyol which can further react with remaining isocyanate groups on the particles to introduce hydroxyl groups onto the surface of the particle. A monofunctional coreactant may be toward the end of the reaction to cap off any isocyanate groups that were not consumed by the polyamine coreactant.

The conditions for the reaction typically include agitation and/or turbulent flow conditions, which helps to disperse the coreactant(s) into droplets until such time as it reacts with isocyanate compounds to form polymer particles. Agitation and/or turbulent flow conditions can be provided in any convenient way, using any convenient apparatus, such as various types of agitated vessels, static mixing devices, ultrasonic mixing devices or other mechanical agitation devices.

The mixture of base polyether, polyisocyanate and coreactant(s) preferably is maintained under agitation and/or turbulent flow conditions until the coreactant(s) have reacted with isocyanate groups in the base polyether mixture to form polyurea particles. It is not necessary to maintain agitation or turbulent flow conditions until all isocyanate groups are consumed, provided that agitation is maintained until the particles have formed. Typically agitation and/or turbulent flow conditions are maintained until at least 50%, preferably at least 75% of the isocyanate groups have been consumed.

The reaction may be performed at a temperature of, for example, 0 to 100° C. An elevated temperature may be desirable to reduce reaction time, but this is often not necessary. It may become more difficult to control the extent of reaction between the base polyether and isocyanate-containing species if the temperature is too high, which can lead to high product viscosity. Typically, the base polyether, coreactant(s) and polyisocyanate mixed while the components are at a temperature of 0 to 100°, preferably 10 to 70° C. and more preferably 20 to 60° C. The mixture is then allowed to react. This can be done without further applied heat if desired. The reaction of the coreactant(s) and polyisocyanate may result in a temperature increase even if no heat is applied. Cooling can be applied if necessary to prevent excessive temperature increases due to the exothermic heat of reaction.

The reaction to form the particles typically requires from 30 seconds to one hour, although this depends on factors such as temperature. A more preferred time of reaction is 1 minute to 10 minutes, and in specific embodiments is 2 to 7 or 2 to 5 minutes. A somewhat longer time may be required for essentially all of the isocyanate groups to react.

The process for making the dispersion can be performed batch-wise, in a semi-batch process, or continuously.

Upon completion of the reaction, the crude dispersion can be stripped or otherwise treated to remove unreacted materials, volatile reaction by-products, and the like. Stripping can be performed, for example, by applying vacuum, preferably coupled with heating the dispersion to an elevated temperature. A stripping agent can be bubbled through the product to facilitate removal of these materials. Filtering of the dispersion can be performed if desired, but an advantage of this invention is that large, unstable agglomerates tend to be formed in very small quantities if at all, making filtering unnecessary in many cases. Thus, in some embodiments, a filtering step can be omitted, and the dispersion used without filtration.

The product is a dispersion of polyurea particles in the base polyether. The dispersion may contain, for example 1 to 50%, 5 to 30%, 8 to 25% or 8 to 15% by weight of the dispersed polyurea particles. For purposes of this invention, the weight of the dispersed polyurea particles is taken to be that of the combined weight of the polyisocyanate, coreactant(s) and the particles of any seed dispersion as may be added into the process.

An advantage of this invention is that the dispersions are highly stable with small particles. The dispersed polyurea particles often have a particle diameter in the range of 15 to 500 nm. In preferred embodiments, at least 90 volume-% of the particles have a particle size of 15 to 500 nm, and in more preferred embodiments at least 90 volume-% of the particles have a particle size of 15 to 400 nm.

A dispersion made in accordance with the invention is useful in making polyurethanes by reaction with a polyisocyanate. When used in such an application the base polyether should have an average of at least two hydroxyl groups per molecule. If the base polyether has fewer than two hydroxyl groups per molecule, the dispersion should be combined with at least one other material, preferably a polyether polyol that has at least two hydroxyl groups per molecule.

The dispersion is useful for making slabstock polyurethane foam. In the slabstock foaming process, the dispersion of the invention is combined with a polyisocyanate (and optionally other isocyanate-reactive materials) and reacted in the presence of a blowing agent to form the foam. The mixed starting materials are dispensed into a region, typically a trough or moving belt, in which they react and rise without constraint or under minimal constraint (such as the weight of a plastic film) and cured to form the foam. Suitable methods for making slabstock polyurethane foam are described, for example, in U.S. Pat. Nos. 5,582,840 and 4,970,243.

Suitable polyisocyanates for use in making slabstock flexible polyurethane foam include those described above.

Suitable blowing agents include physical (endothermic) blowing agents such as various low-boiling chlorofluorocarbons, fluorocarbons, hydrocarbons and the like. Chemical (exothermic) blowing agents that decompose or react under the conditions of the polyurethane-forming reaction are also useful. By far the most preferred chemical blowing agent is water, which reacts with isocyanate groups to liberate carbon dioxide and form urea linkages. Water is preferably used as the sole blowing agent, in which case about 1 to about 7, especially from about 2.5 to about 5, parts by weight water are typically used per 100 parts by weight high equivalent weight polyol. Water may also be used in combination with a physical blowing agent, particularly a fluorocarbon or hydrocarbon blowing agent. In addition, a gas such as carbon dioxide, air, nitrogen or argon may be used as the blowing agent in a frothing process. Carbon dioxide can also be used as a liquid or as a supercritical fluid.

It is highly preferred to include a foam-stabilizing surfactant in the foam formulation. The foam-stabilizing surfactant helps stabilize the gas bubbles formed by the blowing agent during the foaming process until the polymer has cured. A wide variety of silicone surfactants as are commonly used in making polyurethane foams can be used in making the foams with the polymer polyols or dispersions of this invention. Examples of such silicone surfactants are commercially available under the tradenames Tegostab™ (Th. Goldschmidt and Co.), Niax™ (GE OSi Silicones) and Dabco™ (Air Products and Chemicals).

In addition to the foregoing components, the polyurethane foam formulation may contain various other optional ingredients such as other polyols, crosslinkers, chain extenders, cell openers; fillers such as melamine and calcium carbonate; pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; and the like.

The following examples are provided to illustrate the invention, but are not intended to limit the scope thereof. All parts and percentages are by weight unless otherwise indicated.

EXAMPLE 1

An ethylene-oxide capped poly(propylene oxide) diol having a molecular weight of about 4000 is charged to a flask equipped with a stirrer, thermocouple, addition funnel condenser and nitrogen line. Under nitrogen, triethylene tetraamine is added to the diol. The temperature is brought to 30° C. and a nitrogen bleed is started. Then, a polymeric MDI product having an isocyanate functionality of 3.0 is added over a period of 3 to 10 minutes. The amount of triethylene tetraamine and polyisocyanate are selected together so that (1) their combined weight is 10% of the weight of the diol and (2) about 1.05 to 1.2 amino groups are provided per isocyanate group. The slow addition of polyisocyanate minimizes the exothermic temperature increase. The reactor contents are stirred for about an hour after the polyisocyanate addition is complete, and then heated to 60° C. for 2-4 hours. A small amount of aminobutanol is then added to consume any remaining isocyanate groups and introduce hydroxyl groups onto the surface of the particles. The reaction is then continued until all the isocyanate groups have been consumed. A viscous off-white emulsion is obtained. Particle size is determined by diluting the dispersion in more of the diol and then measuring the particles by light scattering methods. The average particle size is about 500 nm.

For comparison, the foregoing experiment is duplicated using a polymeric MDI having a functionality of only 2.3, and a 400 molecular weight amine-terminated polyether in place of the triethylene tetraamine. The particle size is about 800 nm.

EXAMPLES 2-5

Example 2—An ethylene-oxide capped poly(propylene oxide) diol having a molecular weight of about 4000 is charged to a flask equipped with a stirrer, thermocouple, addition funnel condenser and nitrogen line. Under nitrogen, 3,5-di(methylthio)-2,4-diaminotoluene is added to the diol. The temperature is brought to 30° C. and a nitrogen bleed is started. Then, a polymeric MDI product having an isocyanate functionality of 3.0 is added over a period of 3 to 10 minutes. The amount of diamine and polyisocyanate are selected together so that (1) their combined weight is 5% of the weight of the diol and (2) about 1.05 to 1.2 amino groups are provided per isocyanate group. The slow addition of polyisocyanate minimizes the exothermic temperature increase. The reactor contents are stirred for about an hour after the polyisocyanate addition is complete, and then heated to 35° C. for 2-4 hours. A small amount of aminobutanol is then added to consume any remaining isocyanate groups and introduce hydroxyl groups onto the surface of the particles. The reaction is then continued until all the isocyanate groups have been consumed. A viscous off-white emulsion is obtained. Particle size is determined as before, with results as indicated in the following Table.

Example 3 is made in the same general manner, except the amounts of polyisocyanate and diamine are doubled to produce a solids content of about 10%. Particle size is as indicated in the Table.

Example 4 is made in the same manner as Example 3, except the temperature is increased to 60° C. before adding the polyisocyanates and maintained at that temperature through the reaction process. Particle size is as indicated in the Table.

Example 5 is made in the same manner as Example 3, except the amount of aminobutanol is increased to introduce more hydroxyl groups onto the particle surfaces. Particle size is as indicated in the Table.

TABLE

| Ex. No. | Synthesis Temp., ° C. | Solids, wt.-% | Average particle size, nm |
|---|---|---|---|
| 2 | 30/35 | 5.2 | 88 |
| 3 | 30/35 | 10.0 | 124 |
| 4 | 60/60 | 10.0 | 168 |
| 5 | 30/35 | 10.1 | 122 |

What is claimed is:

1. A process for preparing a dispersion of polyurea polymer particles in a base polyether, comprising (I) forming an agitated mixture of (i) one or more polyisocyanate compounds, (ii) one or more coreactants that includes at least 50% by weight of a dialkylthio-substituted aromatic diamine having an equivalent weight per primary and/or secondary amine group of up to 200, and a base polyether having a molecular weight of at least 600, provided that the polyisocyanate compound(s) have an average functionality of at least 2.8, and (II) reacting the coreactant(s) with the polyisocyanate compound(s) in the presence of the base polyether, to form the dispersion of polyurea particles in the base polyether.

2. The process of claim 1 wherein the polyisocyanate compound is a mixture of one or more methylene diphenylisocyanates and one or more polymethylene polyphenylisocyanates.

3. The process of claim 1 wherein the (alkylthio)-substituted aromatic diamine has the structure:

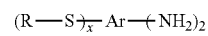

wherein x is a number of at least 1, R represents an inertly substituted alkyl group and Ar represents an aromatic ring structure, and further wherein each R—S— group and each —NH$_2$ group is bonded directly to an aromatic ring carbon of the Ar group.

4. The process of claim 3 wherein the (alkylthio)-substituted aromatic diamine is 3,5-di(methylthio)-2,4-toluene diamine.

5. The process of claim 1 wherein the base polyether has an average of at least 2 hydroxyl groups and a hydroxyl equivalent weight of at least 300.

6. The process of claim 1 wherein the dispersion has a solids content of 8-25% by weight.

7. The process of claim 1 wherein at least 90 volume-% of the dispersed particles in the product dispersion have a particle size of 15 to 500 nm.

* * * * *